July 30, 1935.  H. D. GEYER  2,009,614

ANTISQUEAK BODY BRACKET

Filed June 19, 1933

INVENTOR
Harvey D. Geyer
BY
Spencer Hardman & Fehr
HIS ATTORNEYS

Patented July 30, 1935

2,009,614

UNITED STATES PATENT OFFICE 2,009,614

ANTISQUEAK BODY BRACKET

Harvey D. Geyer, Dayton, Ohio, assignor, by mesne assignments, to General Motors Corporation, Detroit, Mich., a corporation of Delaware Application June 19, 1933, Serial No. 676,510

5 Claims. (Cl. 296—30)

This invention relates to automotive vehicle body construction and more particularly to the joining of the frame members thereof.

An object of this invention is to provide an economical and efficient means for fastening together the various members of a vehicle body frame which will make the joints resiliently flexible and at the same time eliminate squeaks and other noises which ordinarily occur in automobile bodies after a period of use due to the relative motion of the frame members at the joints.

Another object is to provide such a joint which, though resilient, is more permanent and long-lasting than ordinary joints heretofore used, and which will dispense with the use of glue to secure the frame members together.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several views.

Figure 2:
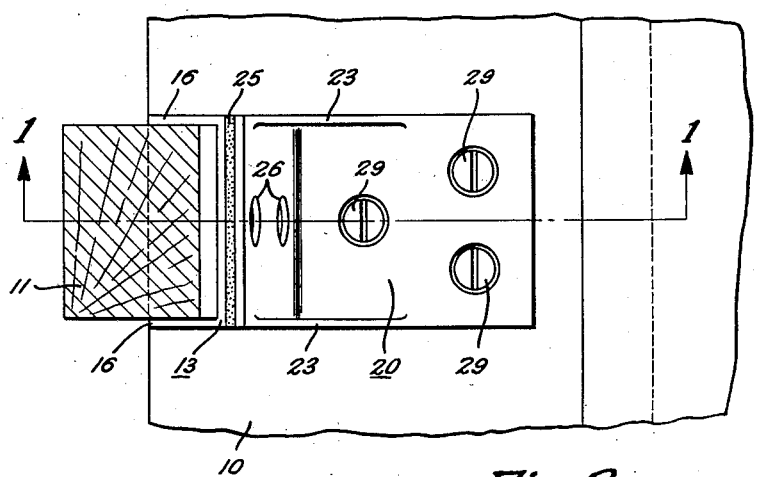
Fig. 2 is a plan view of Fig. 1.
Figure 1:
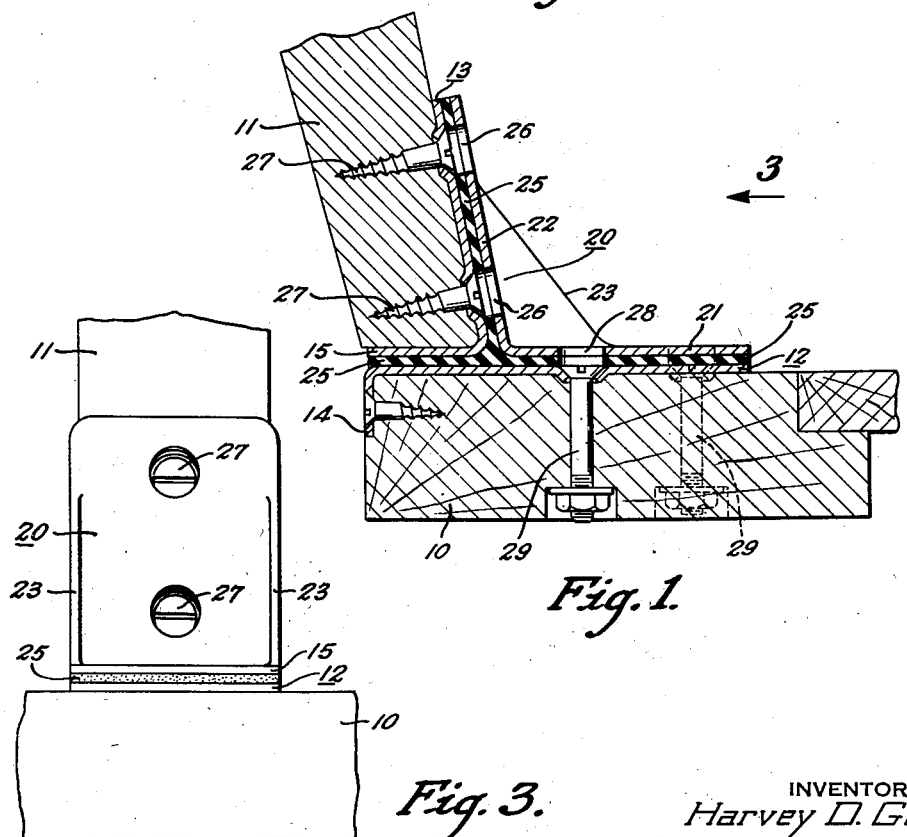
Fig. 1 is a section on line 1—1 of Fig. 2, and shows a joint made according to this invention between the sill and body post of an automobile body frame.
Figure 3:
Fig. 3 is an elevation looking in the direction of arrow 3 of Fig. 1.

The drawing illustrates the invention as applied to a wood body sill 10 and a wood vertical body post 11. A metal plate or fitting 12 is designed to fit upon and be fastened rigidly to the sill 10 by any suitable means. Another metal plate or fitting 13 is designed to fit upon and be rigidly fastened to the body post 11 by any suitable means. In the drawing the plate 12 is shown as having a flange 14 turned down over the edge of sill 10, and plate 13 is shown as having a bottom 15 lying closely adjacent plate 12 and side flanges 16 which embrace the sides of post 11 for the purpose of more rigidly securing said fitting 13 to the post 11.

A metal bracket member 20 is so designed that its integral plate-like legs 21 and 22 may parallel and lie closely adjacent to the metal plates 12 and 13 respectively. Integral gussets 23 are preferably provided on bracket 20 to increase its strength and rigidity.

The three metal parts 12, 13 and 20 have an intervening layer of resilient rubber 25, or other similar non-metallic material, strongly bonded thereto by vulcanization in situ so that these three parts are strongly held together but isolated from each other by the intervening resilient rubber layers 25. This is preferably done by setting the three metal parts 12, 13 and 25 in the vulcanizing mold as inserts and curing the rubber 25 directly thereupon in such manner as to form a strong bond between the rubber and the contacting surfaces of these metal parts. This will provide a unitary resilient joint member which may be later fixed to the frame members for which it was designed.

In the form illustrated, the metal leg 22 and rubber layer 25 are provided with two clearance holes 26 through which the two screws 27 may be inserted for rigidly fixing the fitting 13 to post 11. Similarly the metal leg 21 and its contacting rubber layer 25 are provided with three holes 28 for the insertion of the bolts 29 for fixing the fitting 12 rigidly to the sill 10. It is thus seen that the fittings 12 and 13 may be simply and strongly fixed to their respective frame members without any necessity for providing lateral attaching flanges thereupon. The particular joint chosen for illustration is designed for the connection of only two frame members, but obviously a joint made according to this invention can be designed for connecting three or more frame members if such a joint is required in any case. For such a joint it is simply required to design a metal plate which can be rigidly fixed to each frame member to be joined by the joint and then provide a bracket member having a leg, or flange, or some portion thereof, lying closely adjacent each metal plate and isolated therefrom by an intervening layer of resilient rubber. Obviously the variations in design of a joint made according to this invention are as many as possible variations in design of body frames and it is deemed unnecessary for a full disclosure of the invention to illustrate further variations.

While the form of embodiment of the present invention as herein disclosed, constitutes a preferred form, it is to be understood that other forms might be adopted, all coming within the scope of the claims which follow.

What is claimed is as follows:

1. As an article of manufacture, a unitary angle bracket for joining frame members in resiliently isolated relation, comprising: a metal angle member having two angularly disposed plate-like legs, two spaced metal plates lying opposed to but adjacent said legs respectively, and an intervening relatively thin layer of resilient rubber bonded to said legs and said separate metal plates and forming a single unitary bracket.

2. As an article of manufacture, a unitary angle bracket for joining frame members in resiliently isolated relation, comprising: a metal angle member having two angularly disposed plate-like legs, two spaced metal plates lying closely juxta-posed to said legs respectively, and an intervening layer of resilient rubber bonded to said legs and said separate metal plates and forming a single unitary bracket, said legs and plates having aligned apertures for the insertion of screws or bolts, the aperture in the inner member being smaller than its aligned aperture whereby the head of the fastening means may be inserted through the outer member and engage the inner member.

3. In a vehicle body, in combination, two angularly extending body frame members, a unitary resilient bracket for joining said frame members, said bracket comprising: two spaced metal plates rigidly fixed to said two frame members respectively, a metal angle overlying both of said plates in closely spaced relation therewith, and an intervening isolating thin layer of resilient rubber securely vulcanized to both said metal plates and metal angle, whereby said two frame members are resiliently secured together in mutually isolated relation.

4. In a vehicle body, in combination, two angularly extending body frame members, a unitary resilient bracket for joining said frame members, said bracket comprising: two spaced metal plates fixed to said two frame members respectively, a metal angle member having legs lying juxta-posed to each of said metal plates but spaced therefrom, and an intervening isolating thin layer of resilient rubber bonded to both said metal plates and said overlying metal angle member.

5. In a vehicle body, in combination, two angularly extending body frame members, a unitary resilient bracket for joining said frame members, said bracket comprising: two spaced metal plates fixed to said two frame members respectively, a metal angle member having legs lying juxta-posed to each of said metal plates but spaced therefrom, and an intervening isolating thin layer of resilient rubber bonded to both said metal plates and said overlying metal angle member, and pin means for fixing the underlying areas of said metal plates directly to said frame members, said overlying rubber layer and metal legs having aligned apertures therein for the insertion of said fixing means therethrough.

HARVEY D. GEYER.